United States Patent [19]

Kawabata et al.

[11] Patent Number: 4,779,658

[45] Date of Patent: Oct. 25, 1988

[54] PNEUMATIC SAFETY TIRE

[75] Inventors: Misao Kawabata, Saitama; Toru Tsuda, Higashimurayama; Tsuguyoshi Yamada; Hisao Ushikubo, both of Kodaira; Ichiro Takahashi, Saitama, all of Japan

[73] Assignee: Bridgestone Corporation, Tokyo, Japan

[21] Appl. No.: 54,916

[22] Filed: May 28, 1987

[30] Foreign Application Priority Data

May 28, 1986 [JP] Japan .................... 61-121338

[51] Int. Cl.$^4$ .............................................. B60C 17/06
[52] U.S. Cl. .................................... 152/517; 152/555
[58] Field of Search ............... 152/517, 520, 555, 564, 152/543

[56] References Cited

U.S. PATENT DOCUMENTS

| | | | |
|---|---|---|---|
| 3,911,987 | 10/1975 | Takusagawa et al. | 152/555 X |
| 4,261,405 | 4/1981 | Yamauchi et al. | 152/517 X |
| 4,263,955 | 4/1981 | Ikeda | 152/555 X |
| 4,265,288 | 5/1981 | Kaneko et al. | 152/517 X |
| 4,287,924 | 9/1981 | Deck et al. | 152/517 X |
| 4,365,659 | 12/1982 | Yoshida et al. | 152/555 X |

FOREIGN PATENT DOCUMENTS

| | | |
|---|---|---|
| 1436725 | 5/1976 | United Kingdom . |
| 2026958 | 12/1980 | United Kingdom . |
| 1584553 | 2/1981 | United Kingdom . |

Primary Examiner—Michael W. Ball
Assistant Examiner—Ramon R. Hoch
Attorney, Agent, or Firm—Sughrue, Mion, Zinn, Macpeak, and Seas

[57] ABSTRACT

To improve the durability and the riding comfortableness of a pneumatic safety tire having at least one carcass ply, at least one belt layer, and a pair of crescent-shaped cross-section reinforcing layers, each of the reinforcing layers comprises a higher elastic rubber layer with a hardness of 70 to 85 in Shore A and an elastic modulus of 25 to 60 kg/cm$^2$ and an anticrack rubber layer with a hardness of 55 to 70 in Shore A and an elastic modulus of 10 to 30 kg/cm$^2$. The maximum thickness of the reinforcing layer is preferably 4 to 12 mm. Load applied to the tire during run-flat travel is supported mainly by the higher elastic rubber layer, and crack generation due to tire deformation is reduced by the presence of the anticrack rubber layer.

10 Claims, 2 Drawing Sheets

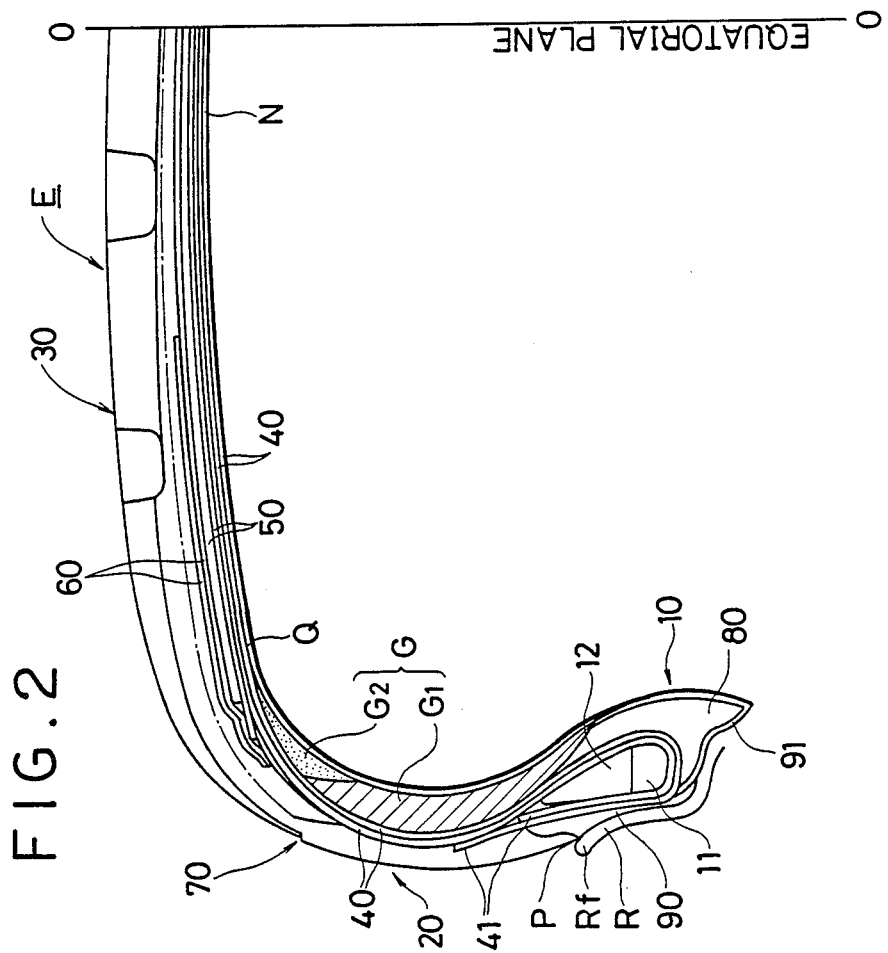

PNEUMATIC SAFETY TIRE

BACKGROUND OF THE INVENTION

1. Field of the Invention

The present invention relates to a pneumatic safety tire and more specifically to an improvement in a pneumatic safety tire which enables run-flat travel at an aspect ratio of 60% or less (a ratio of section height to the maximum width of a tire).

2. Description of the Prior Art

In addition to a strong demand for higher high-speed performance tires with increasing vehicle speed, ultra-high performance tires which can realize spareless tire or run-flat travel have strongly been required to decrease overall vehicle weight.

Various structures of this kind of tire have been proposed under consideration of load supporting capability assured when the tire is punctured. The same applicant has already proposed a safety tire such that the inner surface of a carcass is reinforced by a crescent-shaped cross-section reinforcing layer extending from near the bead portion to the outer edge of the belt on both the sides of the tire. In the safety tire provided with a single crescent-shaped cross-section reinforcing layer, however, run-flat travel tests have clarified the following problems: cracks develop in the maximum deformation portion of the crescent-shaped cross-section reinforced layer, that is, in the inner surface of the maximum distortion portion during run-flat travel, and spread on the tire width direction to such an extent that cords constituting the carcass are cut off (called CBU) into out-of-use.

The inventors have examined the causes of the above cracks and have found that: although the elastic function of the crescent-shaped cross-section reinforced layer can be maintained at the early stage of the run-flat travel, the reinforcing rubber layer itself is deteriorated due to heat generated from inside the rubber with increasing tire travel distance, so that the elastic function of the reinforcing rubber layer is degraded without being able to support a load and therefore the degree of tire deformation increases to such an extent that cracks will be further generated.

To solve the above-mentioned problem, it is possible to prevent the deterioration of reinforcing rubber layer's elastic function due to the above-mentioned heat generation, by uniformly increasing the wall thickness of the reinforcing rubber layer. However, where the wall thickness of the reinforcing rubber layer is simply increased overall the layer, there exists another problem such that riding comfortableness is markedly degraded under the normal vehicle travel conditions.

SUMMARY OF THE INVENTION

With these problems in mind, therefore, it is the primary object of the present invention to provide a pneumatic safety tire which can markedly improve the durability in tire run-flat travel, without degrading the riding comfortableness under the normal tire travel conditions.

To achieve the above-mentioned object, a pneumatic safety tire having a carcass composed of at least one radial cord ply, a belt and a pair of crescent-shaped cross-section reinforcing layers, according to the present invention is characterized in that each of a pair of the crescent-shaped cross-section reinforcing layer comprises:

(a) a higher elastic rubber $G_1$ layer arranged along an inner surface of the carcass at the sidewall portion of the tire; and (b) an anticrack rubber layer $G_2$ arranged along at least part of an inner surface of the higher elastic rubber layer $G_1$ at a volume ratio of higher elastic rubber layer $G_1$ to anticrack rubber layer $G_2$ as $1 < G_1/G_2 < 10$.

The anticrack rubber layer is arranged overall the inner surface of the higher elastic rubber layer or along part of the inner surface thereof extending from near the middle of the sidewall portion to the shoulder portion of the tire.

The higher elastic rubber layer is made of a hard rubber with a hardness of 70 to 85 in Shore A and an elastic modulus of 25 to 60 kg/cm² in tensile stress when elongation strain is 100%. The anticrack rubber layer is made of a relatively soft rubber with a hardness of 55 to 70 in Shore A and an elastic modulus of 10 to 30 kg/cm². The thickness of the crescent-shaped cross-section reinforcing layer is 4 to 12 mm at maximum near the middle of the sidewall portion of the tire.

In the safety tire according to the present invention, the anticrack rubber layer is softer in hardness and 100% elongation modulus than the higher elastic rubber layer. The load applied to the tire during run-flat travel is supported mainly by the higher elastic rubber layer, while crack generation can be reduced by the presence of the anticrack rubber layer, so that durability during run-flat travel can be improved without degrading riding comfortableness during normal travel.

BRIEF DESCRIPTION OF THE DRAWINGS

The features and advantages of the pneumatic safety tire according to the present invention will be more clearly appreciated from the following description taken in conjunction with the accompanying drawings in which like reference numerals designate the same or similar elements or sections throughout the figures thereof and in which:

FIG. 2 is a similar half cross-section view showing the essential portions of the second embodiment of the pneumatic safety tire thereof.

DETAILED DESCRIPTION OF THE PREFERRED EMBODIMENTS

Figure 1:
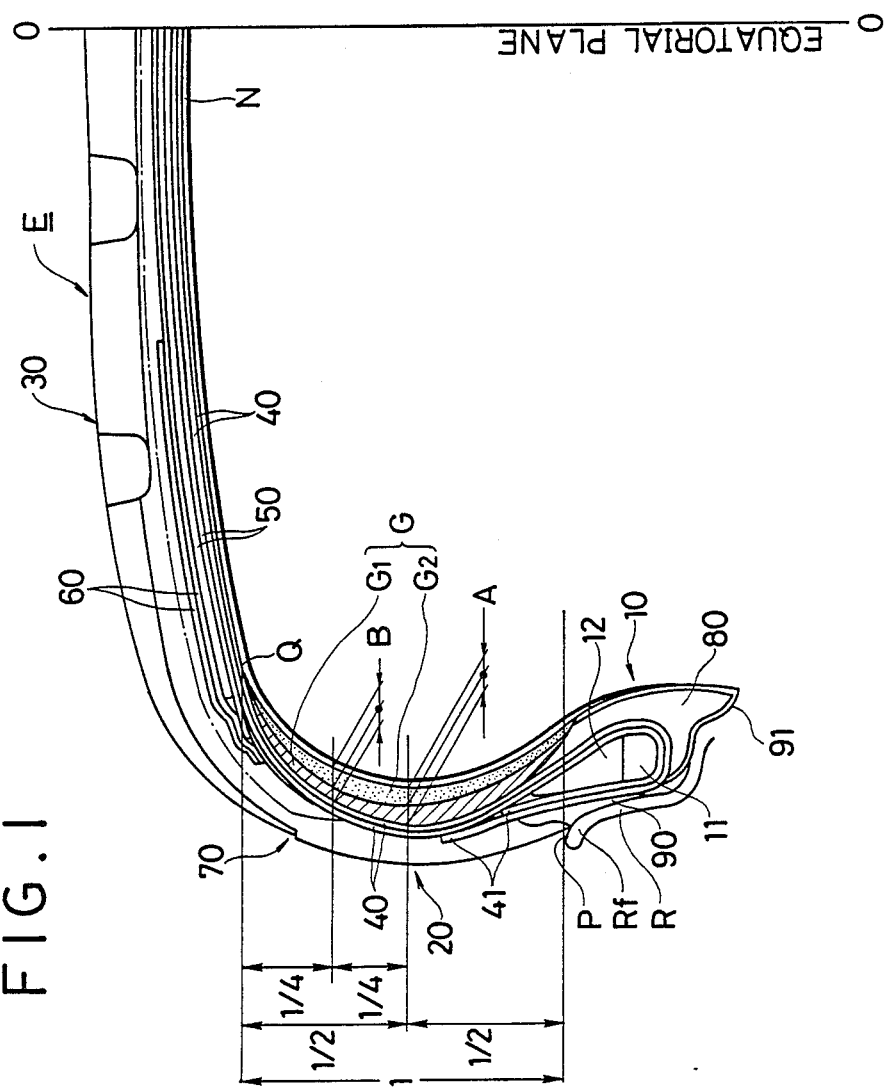
FIG. 1 is a half cross-section view showing the essential portions of the first embodiment of the pneumatic safety tire according to the present invention.

An embodiment of the pneumatic safety tire according to the present invention will be described hereinbelow in detail with reference to the attached drawing.

A pneumatic safety tire E comprises a pair of right and left bead portions 10, a pair of right and left sidewall portions 20 connected to the bead portions 10, respectively and a tread portion 30 connected between these two sidewall portions 20 via two shoulder portions 70.

The tire is further composed of an inner liner N, a carcass composed of two carcass plies 40, a belt composed of two belt layers 50 and two auxiliary layers 60. The carcass 40 includes two layers each formed by arranging rayon cords substantially perpendicular to an equatorial plane 0—0 of the tire. As depicted in FIG. 1, the two carcass plies 40 extend being inclined inward along the inner surface of a bead filler 12 and a bead core 11 and then are bent outward again along the inner surface of the bead core 11 and upward along the outside surface of the bead core 11 and the bead filler 12 to a position where the outermost ends thereof are folded over the carcass layers 40 in such a way that the bead filler 12 with the bead core 11 is enclosed by the carcass layers, respectively.

The belt 50 includes two plies each formed by arranging inextensible cords on the carcass layers so as to cross the tire equatorial plane O—O at an angle (10 to 30 degrees) and laid one upon another so that the arranged cords of the two layers intersect each other. The two auxiliary layers 60 are formed by arranging nylon all over the belt layers 50 substantially in parallel to the tire equatorial plane.

In FIG. 1, the auxiliary layer 60 is formed with two plies. However, the layer 60 may be formed with only a single ply, and the number of the layers 60 is increased or decreased according to the tire usage. Further, the width of the layer 60 is preferably equal to or a little wider than that of the belt 50 from the standpoint of hoop effect upon the belt 50.

In the safety tire thus constructed, the features of the present invention are to provide a pair of crescent-shaped cross-section reinforcing rubber layers G so as to reinforce each inner surface of the carcass 40 extending from near an outermost end of a rim flange $R_f$ of a rim R to which the tire E is mounted to near an end of the belt 50. In particular, each reinforcing rubber layer G of crescent-shaped cross-section is composed of a higher elastic rubber layer $G_1$ and a anticrack layer $G_2$ at a ratio in cross-section (i.e. volume ratio) of $1 < G_1/G_2 < 10$.

The higher elastic rubber layer $G_1$ is arranged on the inner surface of the carcass layers 40 so as to cover the sidewall portion 20 is 70 to 85 in hardness (Shore A) and 25 to 60 kg/cm$^2$ in elastic modulus (in tensile stress when the elongation strain is 100%). The anticrack rubber layer $G_2$ arranged on the inner surface of the higher elastic rubber layer $G_1$ is 55 to 70 in hardness (Shore A) and 10 to 30 kg/cm$^2$ in elastic modulus (in tensile stress when the elongation strain is 100%).

In the first embodiment shown in FIG. 1, the anticrack rubber layer $G_2$ is arranged to cover the entire inner surface of the higher elastic rubber layer $G_1$. On the other hand, in the second embodiment shown in FIG. 2, the anticrack rubber layer $G_2$ is arranged near the shoulder portion 70 or above the higher elastic rubber layer $G_1$ to cover only the upper inclined inner surface of the higher elastic rubber layer $G_1$. In any embodiment of the invention, it should be noted that the entire cross-section of the reinforcing rubber layer G including both $G_1$ and $G_2$ is crescent in shape in both.

With respect to the higher elastic rubber layer $G_1$, if the Shore A hardness is less than 70 and the 100% elongation modulus is less than 25 kg/cm$^2$, load is not well supported during the run-flat travel; while if the Shore A hardness is more than 85 and therefore the 100% elongation modulus is more than 60 kg/cm$^2$, elasticity is too high as when the wall thickness of a single reinforcing rubber layer is excessively increased, thus resulting in a deterioration of riding comfortableness.

On the other hand, with respect to the anticrack rubber layer $G_2$, if the Shore A hardness is less than 55 and the 100% elongation modulus is less than 10 kg/cm$^2$, elasticity is too low so that thermal deterioration occurs due to heat generated from rubber buckling at the vertical portion of the tire. If the Shore A hardness is more then 70 and the 100% elongation modulus is more than 30 kg/cm$^2$, the elasticity reaches that of the higher elastic rubber layer $G_1$, thus resulting in a deterioration of riding comfortableness; that is, it is impossible to obtain a compatibility of riding comfortableness and crack resistance. In this way, it is preferable to determine the properties of the rubber layer $G_2$ to be lower than those of the rubber layer $G_1$ both in Shore A hardness and 100% elongation modulus.

Further, if the volume (or cross-section area) ratio of the higher elastic rubber layer $G_1$ to the anticrack rubber layer $G_2$ ($G_1/G_2$) is less than 1, the anticrack rubber layer $G_2$ is too thick, and therefore $G_1 + G_2$ is excessively large, so that heat is generated and durability is lowered; while $G_1/G_2$ is more than 10, the thickness of the anticrack rubber layer $G_2$ is too thin, so that crack resistance is not sufficient, without resulting in a desired effect.

It is preferable to determine the maximum wall thickness of the reinforcing rubber layer G to lie between 4 and 12 mm although the thickness is dependent upon the properties of the rubber. When the thickness is too small, it is impossible to provide a sufficient reinforcement effect such that load can be supported by the rigidity produced at the tire side wall portion 20. On the other hand, when the thickness is too large, heat will be generated excessively during run-flat travel and additionally riding comfortableness will be degraded during the normal travel.

The rim-fixed protruding rubber member 80 serves to reinforce the bead portion 10 to prevent the bead 10 from coming off during run-flat travel. Further, the protruding rubber member 80 is supported by a rubber chafer 90 bonded to the axially outward side surface of the bead portion 10 and by a fabric member 91 made of textile cord bonded to the inner liner N extending to the inner end of the crescent-shaped cross-section reinforcing layer G.

The hardness (in shore A) of this protruding member 80 (after vulcanization) is from 65 to 85 and more preferably from 70 to 80; while the elastic modulus is from 50 to 120 kg/cm$^2$ and more preferably from 75 to 95 kg/cm$^2$, (in tensile stress when the elongation strain is 100%).

In FIG. 1, the bonding surface between the reinforcing rubber layer G and the rim-fixed protruding hard rubber member 80 is inclined upside axially outward so that the innermost end of layer G and the outermost end of the member 80 are bonded to each other in wedge form. However, it is of course possible to incline the bonding surface upside axially inward. The above-mentioned inclined bonding surface serves to widen the bonding surface area between the reinforcing rubber layer G and the rim-fixed protruding member 80, thus increasing bonding strength during the green tire forming process, while improving the productivity thereof.

It is particularly preferable to form the reinforcing layer G and the protruding member 80 integral with each other in accordance with extrusion forming method, before forming the green tire, because it is possible to prevent creases or cracks from being produced when internal stresses are concentrated to the boundary between the two during the green tire forming process.

In particular, when the reinforcing rubber layer G is formed of rubber having a relatively high Shore hardness (after vulcanization) equivalent to that of the protruding member 80, the previous integral extrusion forming of both is desirable.

The mechanism of generation of creases or cracks at the boundary between the two G and 80 will be described hereinbelow in further detail.

In the vulcanization process of a green tire, a green tire is put into a hollow cavity formed in a roughly rectangular vulcanization mold and then a bladder (for simultaneously forming and vulcanizing a green tire) is brought into contact with the inner side of the green tire while heating a vulcanizing mold, in order to vulcanize it by applying steam pressure. In this process, the bladder first applies pressure to relatively flat portions of the tire (i.e. the middles of the tread portion 30 and the sidewall portion 20) and then to curved portions (i.e. the shoulder portion 70 and the bead portion 10) with a time delay. Therefore, the rubber first heated and pressurized is softened and therefore tends to flow toward the rubber portions heated and pressurized with a time delay, so that creases are easily produced at the rubber portions heated afterward.

The reinforcing cord of the carcass 40 is organic fiber cord represented by nylon, polyester, rayon, and aromatic polyamide fiber cord. The reinforcing cord of the belted layer 50 is cord such as aromatic polyamide fiber code or steel cord. The cord of the auxiliary layer 60 is organic fiber cord having an appropriate heat shrinkability such as nylon cord, polyester cord, etc.

Test Results

To verify the effects of the safety tire according to the present invention, the following durability and riding comfortableness tests have been effected.

[1] Specifications of Test Tires of Present Invention
   (a) Tire size: 255/40VR 17
   (b) Tire structure: As shown in FIG. 1.
   (c) Carcass 40: Two plies are formed by use of rayon cord 1260d/2 arranged at 90 degrees with respect to the tire equatorial plane.
   (d) Belt 50: Two layers are formed so as to intersect each other by use of steel cord $1 \times 5 \times 0.23$ inclined at 22 degrees with respect to the tire equatorial plane.
   (e) Aux. layers 60: A plurality of nylon cords (10 cords) 1260 d/2 are arranged substantially in parallel to the circumferential direction of a rubber-coated ribbon-shaped tire in spiral form extending from one outer end to the other outer end of the auxiliary layer 60 in FIG. 1.
   (f) Reinforcing rubber layer G: As shown in FIG. 1, this layer is composed of a higher elastic rubber layer $G_1$ and an anticrack rubber layer $G_2$ so as to provide a crescent-shaped cross-section in both. The dimensions and properties of these two layers $G_1$ and $G_2$ are as follow in comparison with those of the layer $G_0$ for comparison.

|  | Comparison | Invention | |
|---|---|---|---|
|  | $G_0$ | $G_1$ | $G_2$ |
| Thickness A (mm) | 8 | 5 | 3 |
| Thickness B (mm) | 3 | 2 | 1 |
| Shore A hardness | 76 | 76 | 63 |
| 100% elong. modulus (kg/cm$^2$) | 41 | 41 | 16 |
| Volume ratio | — | 1:3 | |

The above thickness A was measured at an intermediate ($\frac{1}{2}$) position of the height (l) of the reinforcing rubber layer G, while the above thickness B was measured at a position $\frac{1}{4}$ away the outer end Q of the reinforcing rubber layer G, both as depicted in FIG. 1.

The compositions of the higher elastic rubber layer $G_1$, and the anticrack rubber layer $G_2$ are as follows in comparison with those of the layer $G_0$ for comparison.

| Ingredient | Comparison | Invention | |
|---|---|---|---|
|  | $G_0$ | $G_1$ | $G_2$ |
| Polyisoprene rubber | 25 | 25 | 100 |
| Butadiene rubber | 75 | 75 | — |
| FET carbon | 45 | 50 | 30 |
| Light oil | 10 | 5 | 10 |
| Zinc white | 5 | 5 | 5 |
| Accelerator | 1.5 | 2.0 | 0.5 |
| Sulfur | 6 | 6 | 3 |

[2] Specifications of Test Tire for Comparison
   (a) to (e): The same as the tires of the present invention.
   (f) Reinforcing rubber layer $G_0$: The layer is formed only of a crescent-shaped cross-section high elastic rubber layer. The dimensions, properties and ingredient thereof have already been listed above in comparison with those of the tires of the present invention.

[3] Durability Test Method
Test vehicles provided with a test tire having no bulb core only at the right rear wheel were driven at an average speed of 100 km/hr along a test course, until it was impossible to drive the vehicles, to measure a running distance possible as listed in Table below.

[4] Riding Comfortableness Test Method
The test was made in accordance with the ordinary feeling evaluation method. The comfortableness is indicated as indices in comparison with the comparative tire of 100. The greater the indices are, the better will be the comfortableness, as listed in Table below.

|  | Comparison | Invention |
|---|---|---|
| Durability (km) | 100 | 175 |
| Riding comfortableness | 100 | 102 |

The above table indicates that the safety tire according to the present invention can improve the durability markedly in the run-flat travel without degrading the riding comfortableness in the normal travel, as compared with the safety tires for comparison.

What is claimed is:

1. In a pneumatic safety tire having a carcass composed of at least one radial cord ply toroidally extending from a tread portion, through two sidewall portions, to two inner bead portions; a belt arranged on the carcass layer so as to cover the crown portion thereof between two shoulder portions of the tire; an inner liner extending throughout between the both bead portions on the inner surface of the carcass; and a pair of crescent-shaped cross-section reinforcing layers located between the carcass and the inner liner in each of the sidewall portions, wherein each of said reinforcing layers has a thickest portion thereof at substantially the middle of each of the sidewall portions extending from the shoulder portion to the head portion the improvement wherein each of said crescent-shaped cross-section reinforcing layers comprises:
   (a) a higher elastic rubber layer $G_1$ having an elastic modulus of 25 to 60 kg/cm$^2$ in tensile stress when elongation strain is 100% and combined with the inner surface of said carcass at the sidewall portion of the tire; and (b) an anticrack rubber layer $G_2$ having an elastic modulus of 10 to 30 kg/cm$^2$ in tensile stress in said condition but smaller than that of said elastic rubber layer $G_1$ and arranged such that at least part of an outer surface thereof is combined with said elastic rubber layer $G_1$ and an inner surface thereof is combined with said inner liner, respectively at a volume ratio of said higher elastic rubber layer $G_1$ to said anticrack rubber layer $G_2$ as $1 < G_1/G_2 < 10$.

2. The pneumatic safety tire as set forth in claim 1, wherein said anticrack rubber layer $G_2$ is arranged completely along the inner surface of said higher elastic rubber layer $G_1$.

3. The pneumatic safety tire as set forth in claim 1, wherein said anticrack rubber layer $G_2$ is arranged along part of the inner surface of said higher elastic rubber layer $G_1$ extending from near the middle of the sidewall portion to the shoulder portion of the tire.

4. The pneumatic safety tire as set forth in claim 1, wherein said higher elastic rubber layer $G_1$ is made of hard rubber with a hardness of 70 to 85 in Shore A.

5. The pneumatic safety tire as set forth in claim 1, wherein said anticrack rubber layer $G_2$ is made of a soft rubber with a hardness of 55 to 70 in Shore A.

6. The pneumatic safety tire as set forth in claim 1, wherein thickness of said crescent-shaped cross-section reinforcing layer is 4 to 12 mm at maximum near the middle of the wall side portion of the tire.

7. The pneumatic safety tire as set forth in claim 1, further comprising a protruding rubber member positioned axially inside of each of said bead portions and extending to define a portion that seats said tire to a rim when mounted.

8. The pneumatic safety tire as set forth in claim 7, further comprising a rubber chafer bonded to an axially outer side of each of said beads and a textile cord covering said protruding member, said textile cord extending to said crescent-shaped cross-section reinforcing layer and bonded to said inner liner.

9. The pneumatic safety ply tire as set forth in claim 7, wherein the hardness of said protruding member after vulcanizaton in the range of 65 to 85 shore A, and the elastic modulus in the range of 50 to 120 kg/cm$^2$.

10. The pneumatic safety ply tire as set forth in claim 7, wherein a bonding surface between said crescent-shaped reinforcing member and said protruding rubber is inclined axially outward so that said bonding surface is wedge shaped.

* * * * *